United States Patent
Boday et al.

(10) Patent No.: US 9,522,977 B2
(45) Date of Patent: *Dec. 20, 2016

(54) THERMOPLASTIC TOUGHENING OF PHT'S

(71) Applicant: International Business Machines Corporation, Armonk, NY (US)

(72) Inventors: Dylan J. Boday, Tucson, AZ (US); Jeannette M. Garcia, San Jose, CA (US); James L. Hedrick, Pleasanton, CA (US); Rudy J. Wojtecki, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 14/564,289

(22) Filed: Dec. 9, 2014

(65) Prior Publication Data

US 2016/0024254 A1 Jan. 28, 2016

Related U.S. Application Data

(63) Continuation of application No. 14/340,221, filed on Jul. 24, 2014.

(51) Int. Cl.
*C08G 12/02* (2006.01)
*C08G 12/06* (2006.01)
*C08G 12/08* (2006.01)
*C08G 73/06* (2006.01)

(52) U.S. Cl.
CPC ......... *C08G 73/065* (2013.01); *C08G 73/0644* (2013.01)

(58) Field of Classification Search
CPC . C08G 73/0644; C08G 73/0638; C08G 12/02; C08G 12/06; C08G 12/08
See application file for complete search history.

(56) References Cited

U.S. PATENT DOCUMENTS

| | | | |
|---|---|---|---|
| 2,276,309 A * | 3/1942 | Hummel | C08G 12/06 528/247 |
| 2,338,637 A * | 1/1944 | Gundel | C08G 12/02 528/264 |
| 2,889,277 A | 6/1959 | Hughes | |
| 3,340,232 A | 9/1967 | Smith et al. | |
| 3,598,748 A | 8/1971 | Hirosawa | |
| 3,600,362 A * | 8/1971 | Hirosawa | C08L 63/00 523/400 |
| 3,884,917 A * | 5/1975 | Ibbotson | C08G 18/022 521/129 |
| 3,957,742 A | 5/1976 | Kveton | |
| 3,968,104 A * | 7/1976 | Wagner | A01N 25/02 252/364 |
| 4,106,904 A | 8/1978 | Oude Alink et al. | |
| 4,224,417 A | 9/1980 | Hajek et al. | |
| 4,225,481 A | 9/1980 | Wagner | |
| 4,246,160 A | 1/1981 | Wagner et al. | |
| 4,301,262 A | 11/1981 | Wagner et al. | |
| 4,877,451 A | 10/1989 | Winnik et al. | |
| 5,112,796 A | 5/1992 | Iannicelli | |
| 5,674,377 A | 10/1997 | Sullivan, III et al. | |
| 5,830,243 A | 11/1998 | Wolak et al. | |
| 5,898,087 A * | 4/1999 | Cheung | C08G 2/08 568/422 |
| 7,384,434 B2 | 6/2008 | Malfer et al. | |
| 9,120,897 B1 * | 9/2015 | Boday | C08G 75/02 |
| 9,120,899 B1 * | 9/2015 | Boday | C08G 73/0253 |
| 9,255,172 B1 * | 2/2016 | Boday | C08G 73/0644 |
| 2005/0054787 A1 * | 3/2005 | Swedo | C08G 8/10 525/534 |
| 2005/0130847 A1 * | 6/2005 | Gatlin | C07C 211/14 507/200 |
| 2005/0268538 A1 * | 12/2005 | Malfer | C10L 1/221 44/329 |
| 2009/0247709 A1 * | 10/2009 | Ishida | C08G 73/0638 525/417 |
| 2010/0107476 A1 | 5/2010 | Cosimbescu | |

(Continued)

FOREIGN PATENT DOCUMENTS

| | | |
|---|---|---|
| CN | 101265255 A | 9/2008 |
| EP | 2636697 A1 | 9/2013 |
| GB | 928112 A | 6/1963 |
| GB | 1531578 A | 11/1978 |
| WO | 0166614 A2 | 9/2001 |
| WO | 0198388 A1 | 12/2001 |
| WO | 0226849 A1 | 4/2002 |

OTHER PUBLICATIONS

Machine Translation of WO 01/66614, 2016.*
Henri Ulrich et al., Reaction of Chloromethyl Ether with Primary Amines, May 1961, pp. 1637-1638.
Hemant S. Patel et al., Studies on Synthesis and Characterization of some Novel Aromatic Copolyesters based on s-Triazine, Iranian Polymer Journal, vol. 14, No. 12, 2005, pp. 1090-1098.
Fabian Suriano et al., Functionalized cyclic carbonates: from synthesis and metal-free catalyzed ring-opening polymerization to applications, Polymer Chemistry, The Royal Society of Chemistry, 2011, Received Jul. 6, 2010, Accepted Aug. 13, 2010, pp. 528-533.
Wang Yulan et al., Synthesis and Properties of Poly-1, 3, 5-Triazines, Polymer Communications, No. 2, 1984, pp. 117-123.

(Continued)

*Primary Examiner* — Liam J Heincer
(74) *Attorney, Agent, or Firm* — Patterson + Sheridan, LLP

(57) ABSTRACT

Polyhexahydrotriazine (PHT) and polyhemiaminal (PHA) materials chemically modified to include thermoplastic polymer bridging groups, and methods of making such materials, are disclosed. The materials are formed by a process that includes heating a mixture comprising i) a solvent, ii) paraformaldehyde, iii) a diamine monomer comprising two primary aromatic amine groups, and iv) a polymer diamine at a temperature of about 20° C. to less than 150° C. This heating step forms a stable PHA in solution, which can be isolated. The PHA includes covalently bonded thermoplastic polymer groups. The PHA is then heated at a temperature of 150° C. to about 280° C., thereby converting the PHA material to a PHT material that includes covalently bonded thermoplastic polymer groups.

13 Claims, No Drawings

(56) References Cited

U.S. PATENT DOCUMENTS

| | | | |
|---|---|---|---|
| 2012/0049308 A1 | 3/2012 | Nishimura et al. | |
| 2012/0077918 A1* | 3/2012 | Glaser | C08K 3/00 524/425 |
| 2013/0267616 A1* | 10/2013 | McKeown | C08G 12/08 521/27 |
| 2015/0104579 A1* | 4/2015 | Hedrick | C08G 65/00 427/385.5 |
| 2015/0376451 A1* | 12/2015 | Boday | B05D 1/30 427/385.5 |
| 2016/0024253 A1* | 1/2016 | Boday | C08G 73/065 528/149 |

OTHER PUBLICATIONS

John Markoff, Error at IBM Lap Finds New Family of Materials, New York Times, May 15, 2014, 4 pages.

Jeanette M. Garcia et al., Recyclable, Strong Thermosets and Organogels via Paraformaldehyde Condensation with Diamines, Science AAAS, vol. 344, May 16, 2014, pp. 732-735.

D.R. Anderson et al., Thermally resistance polymers containing the s-triazine ring, Journal of Polymer Science Part A-1: Polymer Chemistry, vol. 4, Issue 7, pp. 1689-1702.

T. Okita, Filter method for the determination of trace quantities of amines, mercaptans, and organic sulphides in the atmosphere, Atmospheric Environment (1967), vol. 4, Issue 1, Jan. 1970, pp. 93-102.

Raquel Lebrero et al., Odor abatement in biotrickling filters: Effect of the EBRT on methyl mercaptan and hydrophobic VOCs removal, Bioresource Technology, Special Issue: Innovative Researches on Algal Biomass, vol. 109, Apr. 2012, pp. 38-45.

Elbert, et al. "Conjugate Addition Reactions Combined with Free-Radical Cross-Linking for the Design of Materials for Tissue Engineering," Biomacromolecules 2001, 2, 430-441; Published on Web Mar. 3, 2001.

Ferrar, "Reactions of Formaldehyde With Aromatic Amines," J. Appl. Chem, 14, 1964, 389-399.

Geng, et al., "Nanoindentation behavior of ultrathin polymeric films," Polymer 46 (2005) 11768-11772; Available online Oct. 19, 2005.

Hiller, et al., "Laser-engravable hexahydrotriazine polymer networks," Mat Res Innovat (2002) 6:179-184.

Oliver, et al. "Measurement of hardness and elastic modulus byinstrumented indentation: Advances in understanding andrefinements to methodology," J. Mater. Res., vol. 19, No. 1, Jan. 2004, 3-20.

Singh, et al., "Ultrasound mediated Green Synthesis of Hexa-hydro Triazines,"J. Mater. Environ. Sci. 2 (4) (2011) 403-406.

Stafford, et al., "A buckling-based metrology for measuringthe elastic moduli of polymeric thin films,"Nature Materials Aug. 3, 2004, 545-550;Published online: Jul. 11, 2004.

Ekinci et al., "Preparation, Characterization and H2O2 Selectivity of Hyperbranched Polyimides Containing Triazine", Journal of Polymer Research, 2005, pp. 205-210.

U.S. Appl. No. 14/340,221, entitled Thermoplastic Toughening of PHT's, filed Jun. 24, 2014.

Appendix P: List of IBM Patents or Patent Application Treated as Related.

* cited by examiner

THERMOPLASTIC TOUGHENING OF PHT'S

CROSS-REFERENCE TO RELATED APPLICATIONS

This application is a continuation of co-pending U.S. patent application Ser. No. 14/340,221, filed Jul. 24, 2014. The aforementioned related patent application is herein incorporated by reference in its entirety.

BACKGROUND

The present invention relates to methods of improving physical properties of polyhemiaminal and polyhexahydrotriazine polymers and networks, and more specifically to preparing polyhemiaminals and polyhexahydrotriazines having thermoplastic components incorporated at the molecular level.

Polyhexhydrotriazines (PHT's) and polyhemiaminals (PHA's) are an emerging class of high strength engineering thermosetting polymers that have a unique combination of properties. They have high modulus, solvent resistance, and resistance to environmental stress cracking, but they can be easily recycled by decomposition to monomers in a strong acid.

These polymers are, however, brittle and have poor impact resistance. The have high tensile strength around 52 MPa with yield stress generally below 5%, which limits the applications available for such materials. Conventional methods of mitigating brittleness in polymers, for example polymers such as epoxy resins, has focused on including an elastomeric material in the polymer matrix, either chemically or by blending. Such methods reduce the strength of the material by lower its modulus.

There is a need for a material with the advantages of PHT's and PHA's with low brittleness and high impact resistance, and a method of making such materials.

SUMMARY

Embodiments described herein provide a polyhexahydrotriazine (PHT) that includes a plurality of trivalent hexahydrotriazine groups having the structure

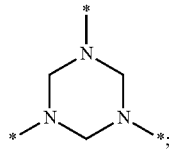

a plurality of divalent bridging groups of formula

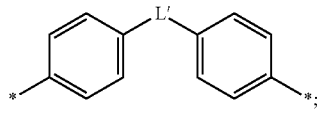

and a plurality of divalent thermoplastic polymer groups of the form *-Q-* each having a molecular weight of at least 1000 g/mole, wherein each starred bond of each hexahydrotriazine group is covalently linked to a starred bond of a divalent bridging group or a starred bond of a divalent polymer group, each starred bond of a given bridging group is linked to a respective starred bond of a hexahydrotriazine group, and each starred bond of a divalent polymer group is linked to a respective starred bond of a hexahydrotriazine group.

Other embodiments described herein provide a method that includes forming a polymer diamine mixture having M1 of at least about 1000 g/mole; forming a reaction mixture comprising i) the polymer diamine mixture, ii) a solvent, iii) paraformaldehyde, and iv) a monomer comprising two primary aromatic amine groups; and heating the reaction mixture at a temperature of 150° C. to about 280° C., thereby forming a PHT. Each molecule of the polymer diamine mixture has the form *-Q-*, wherein each Q is independently a vinyl polymer chain, a polyether chain, a polyester chain, a polyimide chain, a polyamide chain, a polyurea chain, a polyurethane chain, a polyaryl ether sulfone chain, a polybenzoxazole chain, a polybenimidazole chain, an epoxy resin, a polysiloxane chain, a polybutadiene chain, and butadiene copolymer, or a combination thereof.

Other embodiments described herein provide a method that includes forming a mixture comprising i) a solvent, ii) paraformaldehyde, iii) a polymer diamine mixture, and iv) a monomer comprising two primary aromatic amine groups; and heating the mixture at a temperature of about 20° C. or higher to form a polyhemiaminal (PHA). Each molecule of the polymer diamine mixture has the form *-Q-*, wherein each Q is independently a vinyl polymer chain, a polyether chain, a polyester chain, a polyimide chain, a polyamide chain, a polyurea chain, a polyurethane chain, a polyaryl ether sulfone chain, a polybenzoxazole chain, a polybenimidazole chain, an epoxy resin, a polysiloxane chain, a polybutadiene chain, and butadiene copolymer, or a combination thereof.

DETAILED DESCRIPTION

Methods are disclosed for preparing modified polyhemiaminals (PHAs) and polyhexahydrotriazines (PHTs) by the reaction of aromatic diamines, paraformaldehyde, and amine terminated thermoplastic polymers. The PHAs and PHA films are stable intermediates in the preparation of the modified PHTs and PHT films, respectively, and may be modified themselves. The modifications involve chemically adding thermoplastic polymer segments to the PHA or PHT network to improve toughness of the resulting polymer network.

The PHAs are generally prepared at a temperature of about 20° C. to about 120° C., more, preferably at about 20° C. to about 100° C., and most preferably at about 40° C. to about 60° C. The PHAs form films when cast from a polar aprotic solvents (e.g., NMP), and the PHA films are stable at a temperature of about 20° C. to less than 150° C. The PHA films can have a Young's modulus of about 6 GPa, which is exceptionally high for an organic film.

The PHT films are formed by thermally treating a PHA film at a temperature of at least 150° C., preferably about 165° C. to about 280° C., more preferably about 180° C. to about 210° C., and most preferably about 190° C. to about 210° C. for a period of time of about 1 minute to about 24 hours, and more preferably about 1 hour. The PHT films can have high heat resistance as measured by dynamic mechanical analysis (DMA). The PHT films can also have a high Young's modulus as measured by nanoindentation methods. In some instances, the Young's modulus of a PHT film can have a value in a range of about 8 GPa to about 14 GPa, exceeding that of bone (9 GPA).

Herein, a polyhemiaminal (PHA) is a crosslinked polymer comprising i) plurality of trivalent hemiaminal groups of formula (1):

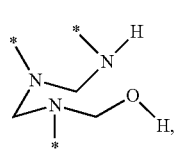

(1)

covalently linked to ii) a plurality of bridging groups of formula (2):

(2), wherein y' is 2 or 3, and K' is a divalent or trivalent radical. Herein, starred bonds represent attachment points to other portions of the chemical structure. Each starred bond of a given hemiaminal group is covalently linked to a respective one of the bridging groups. Additionally, each starred bond of a given bridging group is covalently linked to a respective one of the hemiaminal groups.

As an example, a polyhemiaminal can be represented herein by formula (3):

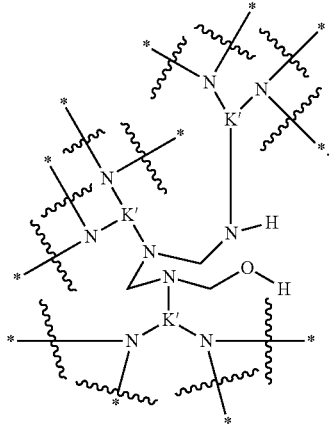
(3)

It should be understood that each nitrogen having two starred wavy bonds in formula (3) is a portion of a different hemiaminal group.

The structure of formula (3) can also be represented using the notation of formula 4):

to a respective one of the hemiaminal groups. K' may be the same in each instance, or different bridging groups K' may be used randomly or in a block manner.

Non-limiting exemplary trivalent bridging groups include:

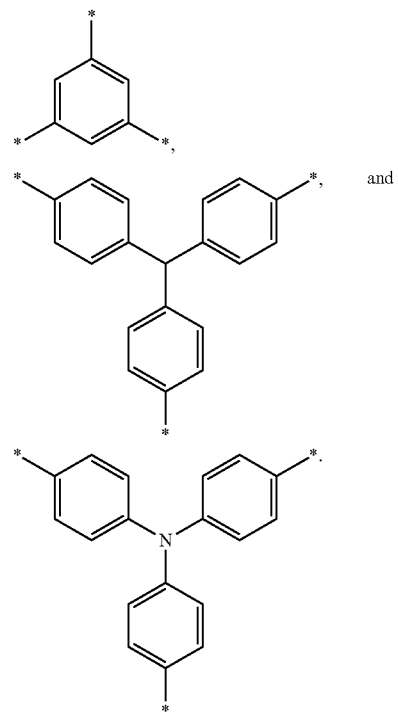
and

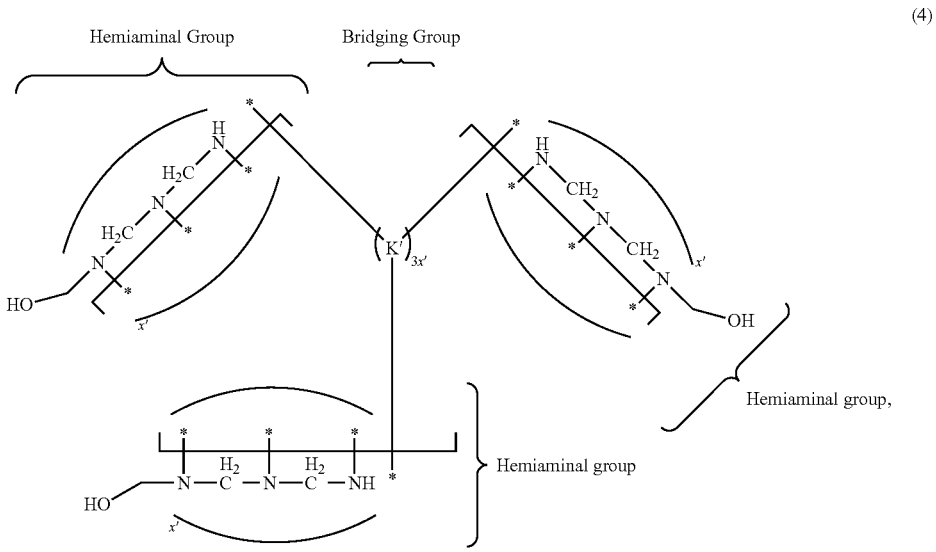
(4)

wherein x' is moles and each bridging group K' is a trivalent radical (y'=3 in formula (2)). It should be understood that each starred nitrogen bond of a given hemiaminal group of formula (4) is covalently linked to a respective one of the bridging groups K'. Additionally, each starred bond of a given bridging group K' of formula (4) is covalently linked The bridging groups can be used singularly or in combination. Amine terminated star polymers and dendrimers may be used as thermoplastic constituents.

The remainder of the description discusses divalent bridging groups K'. It should be understood that the methods and principles below also apply to trivalent linking groups.

Polyhemiaminals composed of divalent bridging groups K' can be represented herein by formula (5):

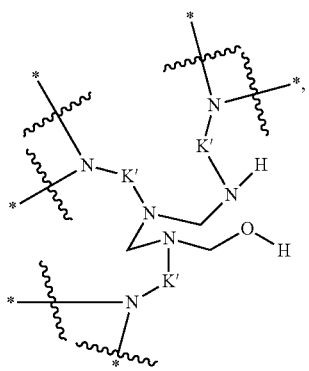

(5)

wherein K' is a divalent radical (y'=2 in formula (2)) comprising at least one 6-carbon aromatic ring. Each nitrogen having two starred wavy bonds in formula (5) is a portion of a different hemiaminal group.

The di- and tri-valent bridging groups may include polymer groups. The polymer groups may be added by obtaining a diamine terminated polymer, such as a diamine terminated vinyl polymer, a diamine terminated polyether, a diamine terminated polyester, a diamine terminated star polymer, a diamine terminated polyaryl ether sulfone, a diamine terminated polybenzoxazole polymer, a diamine terminated polybenimidazole polymer, a diamine terminated epoxy resin, a diamine terminated polysiloxane polymer, a diamine terminated polybutadiene polymer, and a diamine terminated butadiene copolymer. Diamine terminated polyethers are commercially available from suppliers such as Huntsman Corp. Diamine terminated vinyl polymers include long-chain alkyl diamines which may be referred to as polyalkylene diamines, for example polyethylene diamine, polypropylene diamine, and other such polymer diamines. Diamine terminated vinyl polymers also include long-chain polymer diamines with cyclic and/or aromatic components, such as diamine terminated polystyrene. The diamine terminated polymers and oligomers referred to above are commercially available, or may be readily synthesized through well-known reaction pathways.

Divalent polymer bridging groups generally have the formula *-Q-*, where Q is a vinyl polymer chain, a polyether chain, a polyester chain, a polyimide chain, a polyamide chain, a polyurea chain, a polyurethane chain, a polyaryl ether sulfone chain, a polybenzoxazole chain, a polybenimidazole chain, an epoxy resin, a polysiloxane chain, a polybutadiene chain, and butadiene copolymer, or a combination thereof. Typically, a divalent polymer bridging group of these materials will have a molecular weight that is at least 1000 g/mole. The polymer bridging groups used in embodiments described herein typically come from mixtures of polymer diamine molecules having the general formula $H_2N$-Q-$NH_2$ having a distribution of molecular weights. Molecular weight of a polymer mixture is usually expressed in terms of a moment of the molecular weight distribution of the polymer mixture, defined as $$M_z = \frac{\sum m_i^z n_i}{\sum m_i^{z-1} n_i},$$

where $m_i$ is the molecular weight of the ith type of polymer molecule in the mixture, and $n_i$ is the number of molecules of the ith type in the mixture. $M_1$ is also commonly referred to as $M_n$, the "number average molecular weight". $M_2$ is also commonly referred to as $M_w$, the "weight average molecular weight". The polymer mixtures used to obtain divalent polymer bridging groups in the materials described herein may have $M_1$ of at least about 1000 g/mol.

Molecular weight distribution of a polymer mixture may be indicated by a polydispersity ratio $P_z$, which may be defined as $$P_z = \frac{M_{z+1}}{M_z},$$

where $M_z$ is defined above. The polymer bridging groups used in embodiments described herein typically come from polymer molecule mixtures having a polydispersity ratio $P_1$ of about 1-3, for example about 2.

The polymer bridging groups impart some molecule-scale flexibility to the PHT or PHA polymer network, imparting toughness and impact resistance to the material. A narrow distribution of molecule sizes in the polymer bridging groups provides maximum efficiency of adding impact resistance per mole of polymer bridging groups added. Longer polymer chains added to the polymer network provide more toughness than short chains, so in a broad molecular weight distribution of polymer bridging groups, the short chains will have much less effect on impact resistance and toughness than the longer chains.

In one embodiment, the polyaryl ether sulfone polymer of formula (6) for use in forming a PHT or PHA network may be prepared by reacting a bis-haloaryl sulfone, a diol such as bisphenol A, and an aminophenol such as 1,4-aminophenol in the presence of a base.

(6)

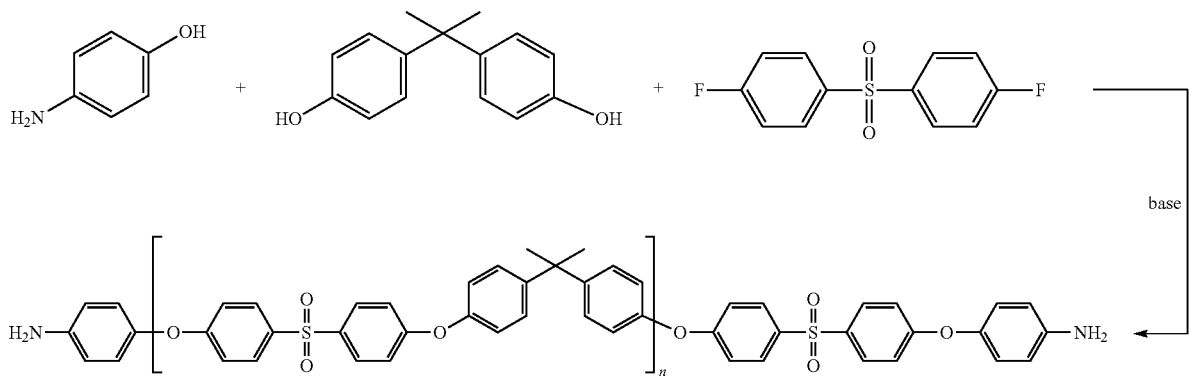

The reaction may be performed in a dipolar aprotic solvent such as N-methyl-2-pyrrolidone (NMP), dimethylsulfoxide (DMSO), N,N-dimethylformamide (DMF), N,N-dimethylacetamide (DMA), propylene carbonate (PC), and/or propylene glycol methyl ether acetate (PGMEA). The sulfone and diol form a polymer terminated by halogen atoms, and the 1,4-aminophenol replaces the halogen atoms to leave an amine-terminated sulfone polymer. The reaction of the sulfone and diol is performed in the presence of a base, such as potassium carbonate. Molecular weight of the sulfone polymer molecules can be controlled by providing a slight excess of one reactant according to the Carothers equation. Addition of the aminophenol stops the polymerization reaction by removing the reactive halide ends.

Other amine-terminated polymers that may be used as precursors for a PHA or PHT reaction include bis-amino polyethers, which are commercially available or may be prepared by polymerizing an alkylene oxide to a polyalkylene glycol, and then aminating the polyalkylene glycol. A wide variety of reaction pathways are known for producing diamine terminated polymers and oligomers.

Other divalent bridging groups that may be used have the formula (7):

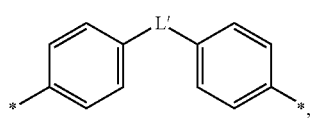

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. In an embodiment, R' and R" are independently selected from the group consisting of methyl, ethyl, propyl, isopropyl, phenyl, and combinations thereof. Other L' groups include methylene (*—CH$_2$—*), isopropylidenyl (*—C(Me)$_2$-*), and fluorenylidenyl:

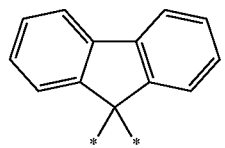

Polyhemiaminals composed of divalent bridging groups of formula (7) can be represented herein by formula (8):

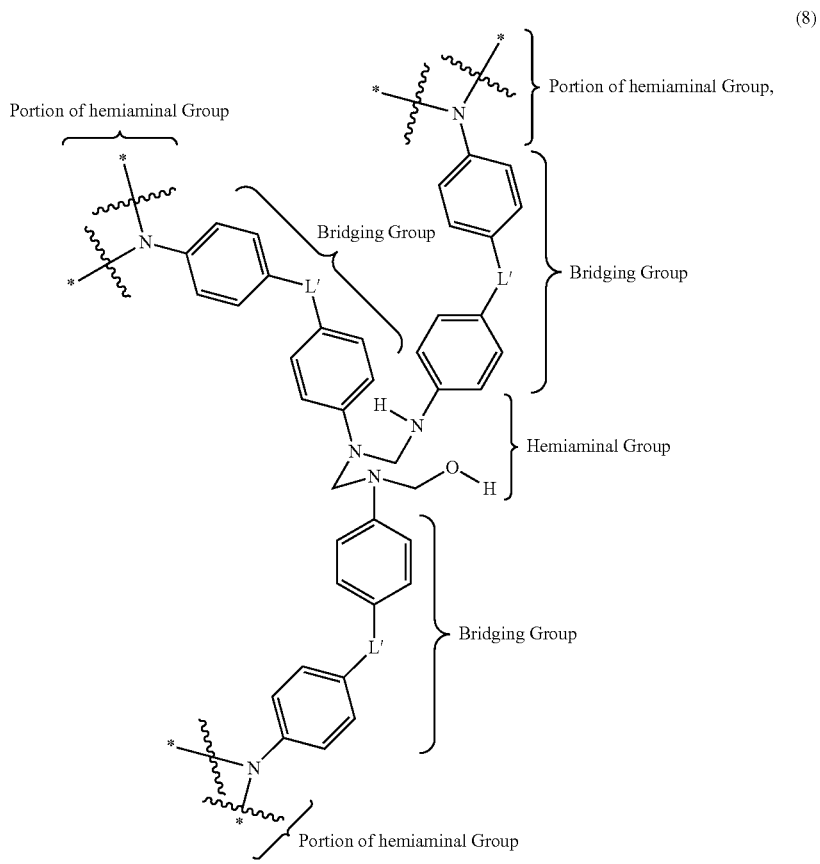

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. Each nitrogen having two starred wavy bonds in formula (7) is a portion of a different hemiaminal group. Any of the bridging groups of formula (7) may be replaced by a polymer bridging group *-Q-*, as described above, to promote toughness and impact resistance.

A polyhemiaminal including divalent bridging groups of formula (7) and polymer bridging groups *-Q-* may be represented by formula (9):

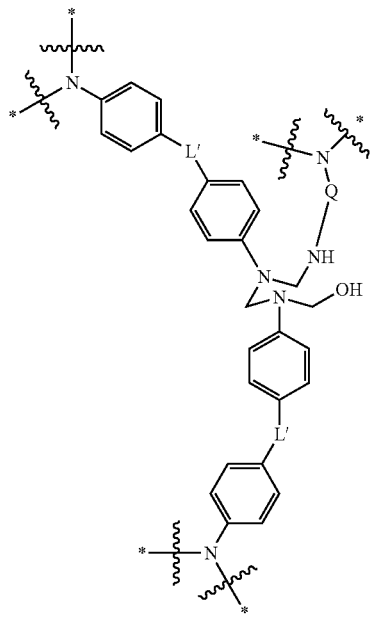

(9)

Although the hemiaminal polymer of formula (9) is shown with only 1 polymer bridging group *-Q-* and two bridging groups of formula (7), any given hemiaminal center of the polymer network may have 1, 2, or 3 polymer bridging groups *-Q-*. Different hemiaminal centers of a polymer molecule may have different numbers of polymer bridging groups. One hemiaminal center may have 3 polymer bridging groups, another hemiaminal center may have 2 polymer bridging groups and 1 bridging group of formula (7), another hemiaminal center may have 1 polymer bridging group and 2 bridging groups of formula (7), and another hemiaminal center may have 3 bridging groups of formula (7).

If, in formula (9), Q is derived from the polymer of formula (6), a hemiaminal may be represented by formula (10).

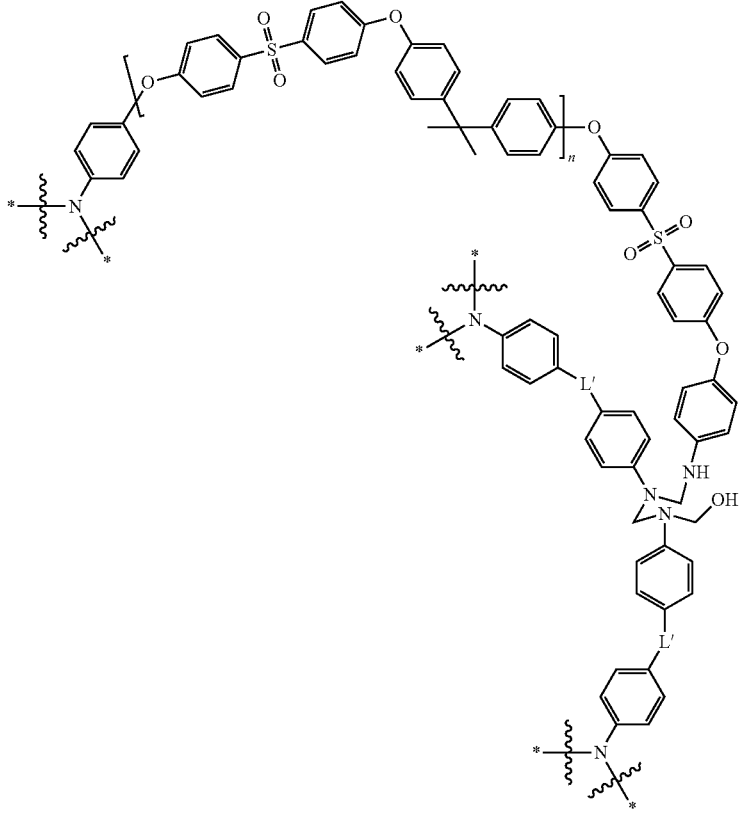

(10)

The hemiaminal groups can be bound non-covalently to water and/or a solvent. A non-limiting example is a hemiaminal group that is hydrogen bonded to two water molecules as shown in formula (11):

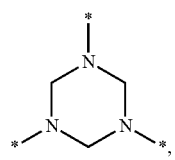
(11)

In an embodiment, a polyhexahydrotriazine (PHT) is a crosslinked polymer comprising i) a plurality of trivalent hexahydrotriazine groups of formula (12):

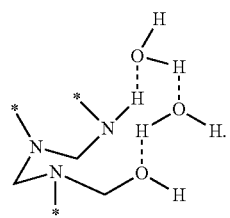
(12)

covalently linked to ii) a plurality of divalent bridging groups K' (y'=2) of formula (2). Each starred bond of a given hexahydrotriazine group of formula (12) is covalently linked to a respective one of the bridging groups K'. Additionally, each starred bond of a given bridging group is covalently linked to a respective one of the hexahydrotriazine groups.

For PHTs comprising bridging groups of formula (6) and formula (7), the polyhexahydrotriazine may be represented herein by formula (13):

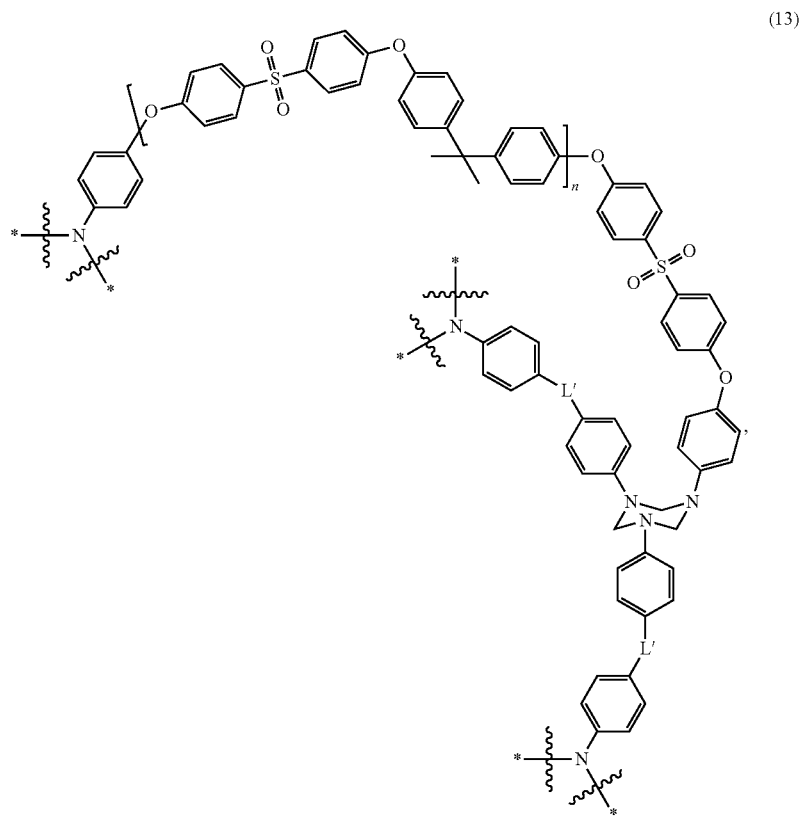
(13)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. Each nitrogen having two starred wavy bonds in formula (13) is a portion of a different hexahydrotriazine group. In formula (13), one bridging group is a polymer bridging group, specifically the polymer of formula (6), but a hexahydrotriazine (HT) center in a polymer molecule may have 1, 2, or 3 polymer bridging groups *-Q-*. The HT centers of a polymer molecule may have different numbers of polymer bridging groups. One HT center of a polymer molecule may have 1 polymer bridging group *-Q-*, while another HT center has 2 polymer bridging groups *-Q-*, and another HT center has 3 polymer bridging groups *-Q-*. In the PHA and PHT materials described herein, a ratio of number of L' groups to number of Q groups may be at least about 30.

The PHA and PHT materials of formulas (10) and (13) may have more than one type of polymer bridging group. A first polymer bridging group may be a first polymer while a second polymer bridging group is a second polymer different from the first polymer. Each of the first and second polymers may be of the same type (e.g., a vinyl polymer chain, a polyether chain, a polyester chain, a polyimide chain, a polyamide chain, a polyurea chain, a polyurethane chain, or a polyaryl ether sulfone chain), or a different type. For example, each of the polymer bridging groups in a PHA or PHT material may be independently selected from a vinyl polymer chain, a polyether chain, a polyester chain, a polyimide chain, a polyamide chain, a polyurea chain, a polyurethane chain, a polyaryl ether sulfone chain, a polybenzoxazole chain, a polybenimidazole chain, an epoxy resin, a polysiloxane chain, a polybutadiene chain, and a butadiene copolymer. In some embodiments, the first polymer and the second polymer may be the same polymer, but may have different $M_1$ molecular weight moments. In this way, a polymer diamine mixture having uniform composition but bimodal (or multimodal) molecular weight distribution may be used to form a PHT or a PHA. In such embodiments, the relative quantities of the molecular weight modes may be selected by varying the amounts of the first and second polymers. It should be noted that any number of different polymer diamines may be used in the polymer diamine mixture.

The polyhexahydrotriazine can be bound non-covalently to water and/or a solvent (e.g., by hydrogen bonds).

Non-polymeric divalent bridging groups that may be used include:

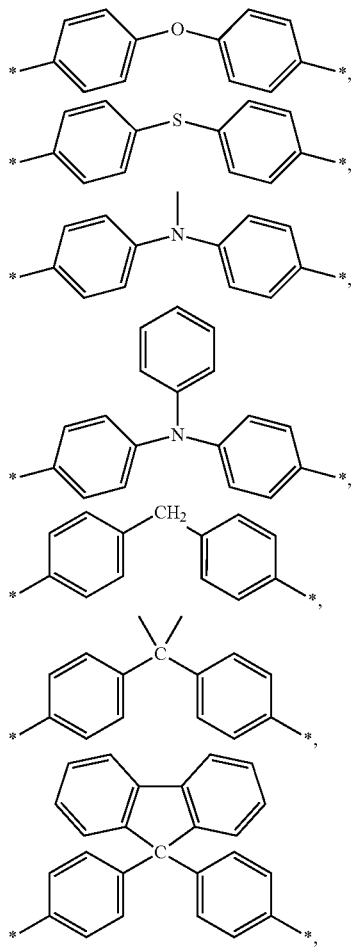

and combinations thereof.

The PHA and PHT can further comprise monovalent aromatic groups (referred to herein as diluent groups), which do not participate in chemical crosslinking and therefore can serve to control the crosslink density as well as the physical and mechanical properties of the PHA and PHT polymers. Monovalent diluent groups have a structure according to formula (14), formula (15), formula (16), and/or formula (17):

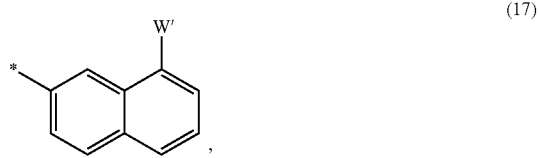

wherein W' is a monovalent radical selected from the group consisting of *—$N(R^1)(R^2)$, *—$OR^3$, —$SR^4$, wherein $R^1$, $R^2$, $R^3$, and $R^4$ are independent monovalent radicals comprising at least 1 carbon. The starred bond is linked to a nitrogen of a hemiaminal group or a hexahydrotriazine group.

Non-limiting exemplary diluent groups include:

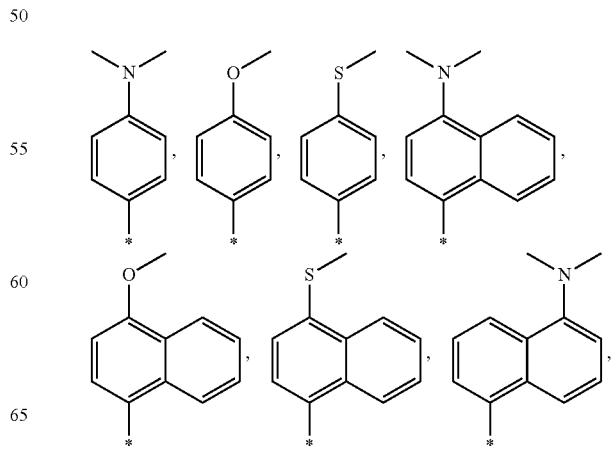

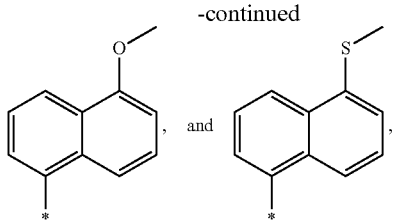

wherein the starred bond is linked to a nitrogen of a hemiaminal group or a hexahydrotriazine group. Diluent groups can be used singularly or in combination.

A method of preparing a polyhemiaminal (PHA) comprising divalent bridging groups, including thermoplastic groups, comprises forming a first mixture comprising i) a monomer comprising two or more primary aromatic amine groups, ii) a polymer diamine, iii) an optional diluent monomer comprising one aromatic primary amine group, iv) paraformaldehyde, and v) a solvent. The first mixture is then preferably heated at a temperature of about 20° C. to about 120° C. for about 1 minute to about 24 hours, thereby forming a second mixture comprising the PHA. In an embodiment, the monomer comprises two primary aromatic amine groups.

The mole ratio of paraformaldehyde:total moles of primary amine groups (e.g., diamine monomer plus polymer diamine plus optional monoamine monomer) is preferably about 1:1 to about 1.25:1, based on one mole of paraformaldehyde equal to 30 grams.

Non-limiting exemplary monomers comprising two primary aromatic amine groups include 4,4'-oxydianiline (ODA), 4,4'-methylenedianiline (MDA), 4,4'-(9-fluorenylidene)dianiline (FDA), p-phenylenediamine (PD), 1,5-diaminonaphthalene (15DAN), 1,4-diaminonaphthalene (14DAN), and benzidene, which have the following structures:

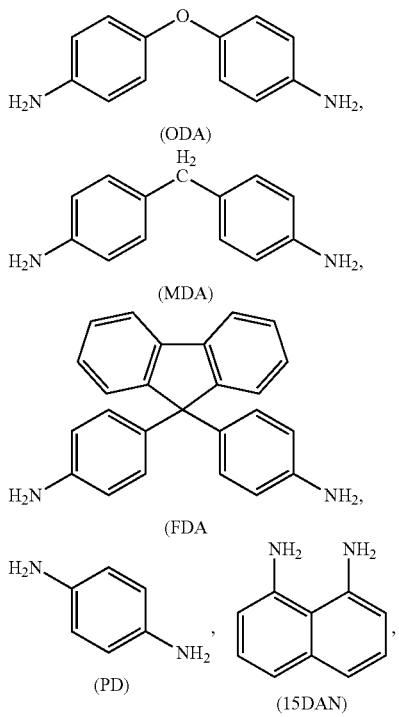

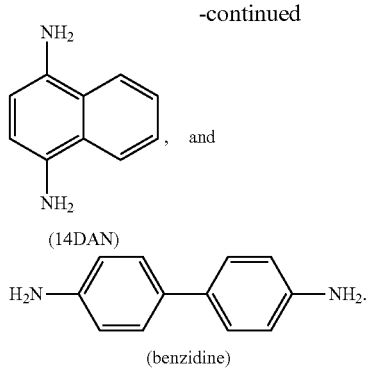

Non-limiting exemplary diluent monomers include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

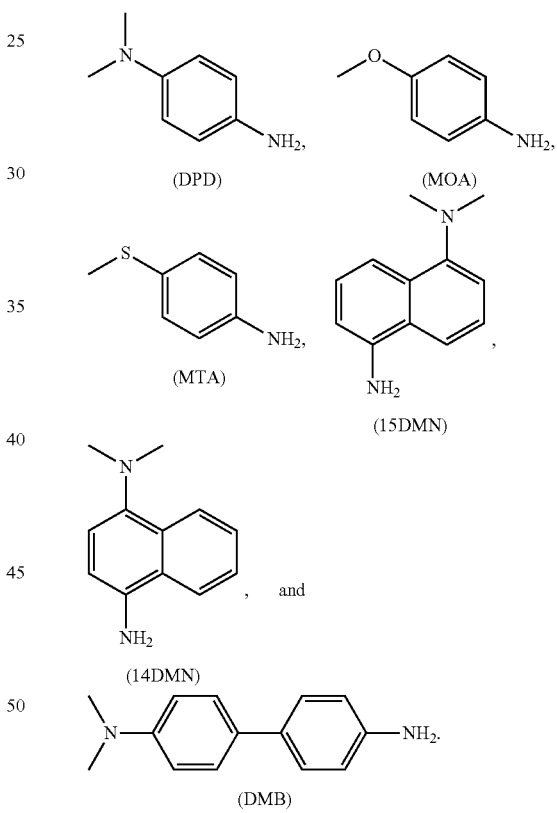

The diluent monomer can be used in an amount of 0 mole % to about 75 mole % based on total moles of monomer and diluent monomer.

The solvent can be any suitable solvent. Preferred solvents include dipolar aprotic solvents such as, for example, N-methyl-2-pyrrolidone (NMP), dimethylsulfoxide (DMSO), N,N-dimethylformamide (DMF), N,N-dimethylacetamide (DMA), Propylene carbonate (PC), and propylene glycol methyl ether acetate (PGMEA). Most preferably, the solvent is NMP.

A method of preparing a polyhexahydrotriazine (PHT) having divalent bridging groups, including thermoplastic groups, comprises forming a first mixture comprising i) a monomer comprising two aromatic primary amine groups, ii) a polymer diamine mixture, iii) an optional diluent monomer comprising one aromatic primary amine group, iv) paraformaldehyde, and v) a solvent, and heating the first mixture at a temperature of at least 150° C., preferably about 165° C. to about 280° C., thereby forming a second mixture comprising a polyhexahydrotriazine. The heating time at any of the above temperatures can be for about 1 minute to about 24 hours.

Alternatively, the PHT can be prepared by heating the solution comprising the PHA at a temperature of at least 150° C., preferably about 165° C. to about 280° C. even more preferably at about 180° C. to about 220° C., and most preferably at about 200° C. for about 1 minute to about 24 hours.

Also disclosed is a method of preparing a thermoplastic modified polyhemiaminal film using the PHA materials having thermoplastic constituents described herein. A mixture comprising a thermoplastic modified polyhemiaminal, prepared as described above, and a solvent is disposed on a surface of a substrate, thereby forming an initial film layer comprising the polyhemiaminal, solvent and/or water on the substrate. The initial film layer is heated at a temperature of about 20° C. to about 120° C. for about 1 minute to about 24 hours, thereby forming a thermoplastic modified polyhemiaminal (PHA) film layer substantially free of solvent and/or water on the substrate.

The substrate can be any suitable substrate, in particular any substrate whose Young's modulus is a factor of 5 greater than the polyhemiaminal and/or polyhexahydrotriazine. Non-limiting examples of these materials include semiconductor wafers (e.g., silicon wafers), most metals, refractory materials, and possibly harder polymers.

The solvent mixture containing the PHA can be cast onto the substrate using any suitable coating technique (e.g., spin coating, dip coating, roll coating, spray coating, and the like).

Also disclosed is a method of preparing a thermoplastic modified polyhexahydrotriazine (PHT) film from a thermoplastic modified PHA film. A thermoplastic modified polyhemiaminal film layer, such as the film layer described above, can be heated at a temperature of at least 150° C., preferably about 165° C. to about 280° C. even more preferably at about 180° C. to about 220° C., and most preferably at about 200° C., thereby forming a film comprising a thermoplastic modified polyhexahydrotriazine (PHT) film layer. The heating time at any of the above temperatures can be about 1 minute to about 24 hours. The thermoplastic modified PHT film layer is substantially free of solvent and water. The hemiaminal groups of the thermoplastic modified PHA film are substantially or wholly converted to hexahydrotriazine groups by heating the film at a temperature in this range.

The $M_1$ molecular weight moment of the PHA and/or PHT polymers described herein can be in a range of 5000 to 100,000, such as a range of 10,000 to 50,000.

The thermoplastic modified PHA's and PHT's described herein are attractive for applications requiring lightweight, rigid, strong thermosets with good impact resistance.

The following examples illustrate the preparation of the thermoplastic modified PHA and PHT solids and films, and the characterization of their physical properties.

EXAMPLES

N-Methyl-2-pyrrolidone (NMP) and paraformaldehyde (PF) were purchased from Aldrich and used as received.

4,4'-Oxydianiline (ODA) was purchased from Aldrich, rinsed with acetone and dried in an Abderhalden drying pistol overnight prior to use.

Syntheses

Example 1 (Comparative)

Preparation of Polymer P-1

P-1, a polyhemiaminal, was prepared by reaction of 4,4'-oxydianiline (ODA) with paraformaldehyde (PF) at PHA forming conditions. 4,4'-Oxydianiline (ODA, 0.20 g, 1.0 mmol) and paraformaldehyde (PF, 0.15 g, 5.0 mmol, 5 equivalents (eq.)) were weighed out into a 2-Dram vial inside a $N_2$-filled glovebox. N-methylpyrrolidone (NMP, 6.2 g, 6.0 mL) was added (0.17 M). The vial was capped but not sealed. The reaction mixture was removed from the glovebox, and heated in an oil bath at 50° C. for 24 hours (after approximately 0.75 hours, the polymer begins to precipitate in NMP). The polyhemiaminal P-1 was precipitated in acetone or water, filtered and collected to yield 0.22 g, >98% yield as a white solid.

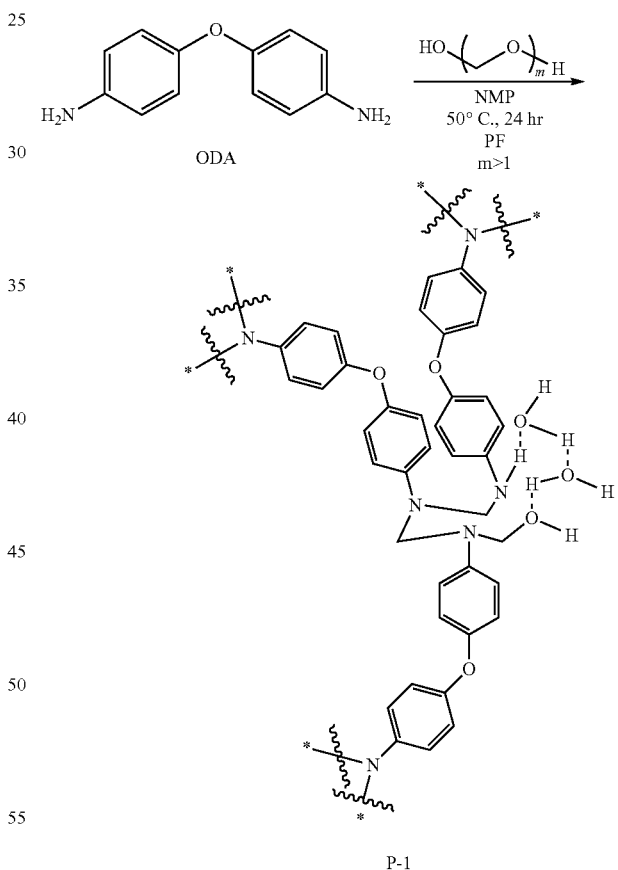

Example 2 (Comparative)

Preparation of Polymer P-4

P-4, a polyhexahydrotriazine, was prepared by reaction of 4,4'-oxydianiline (ODA) with paraformaldehyde (PF) at PHT forming conditions. ODA (0.20 g, 1.0 mmol) and PF (0.15 g, 5.0 mmol, 2.5 eq.) were weighed out into a 2-Dram vial inside a N$_2$-filled glovebox. NMP (6.2 g, 6.0 mL, 0.17 M) was added. The reaction mixture was removed from the glovebox, and heated in an oil bath at 200° C. for 3 hours (after approximately 0.25 hours, the polymer begins to gel in the NMP). The solution was allowed to cool to room temperature and the polymer was precipitated in 40 mL of acetone, allowed to soak for 12 hours, then filtered and dried in a vacuum oven overnight and collected to yield 0.21 g, 95% yield of P-4 as an off-white solid.

cure at 50° C. for 24 h. The clear and colorless HDCN film was carefully floated from the glass plate by cutting the edges with a razor blade and submerging the glass plate in deionized water. This film is a standard PHA film, but could be thermoplastic modified by including a polymer diamine with the ODA and paraformaldehyde in the reaction mixture. A reaction scheme for making a fully thermoplastic modified PHA film using only a polymer diamine and paraformaldehyde would be as follows:

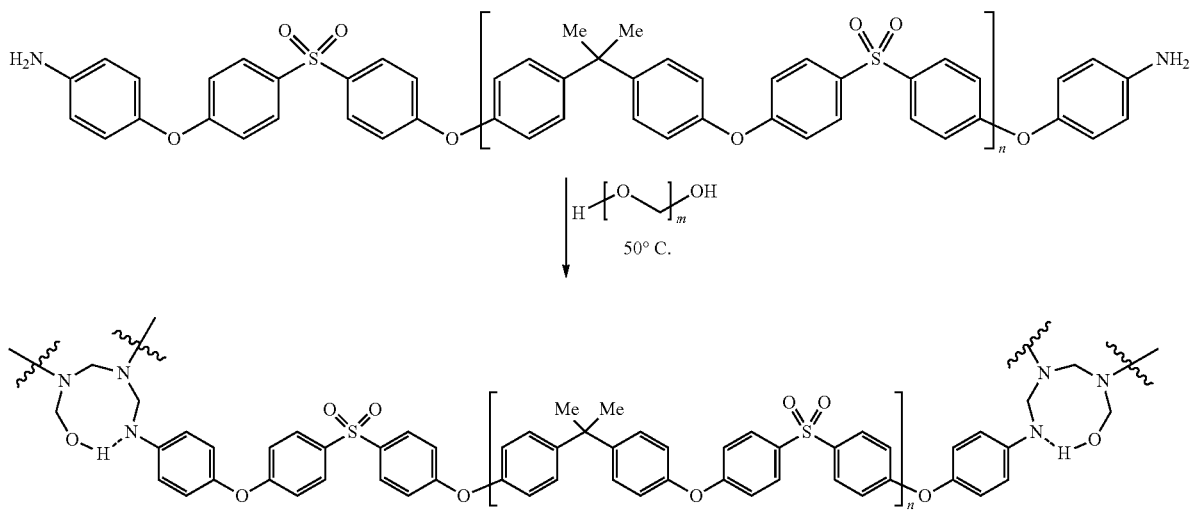

Example 4

Representative Procedure for Casting PHT Films 4,4'-oxydianiline (ODA, 0.400 g, 2.0 mmol) and paraformaldehyde (2.5 equiv, 0.150 g, 5.0 mmol) were weighed into a 2-Dram vial equipped with a stirbar. N-Methylpyrrolidone (NMP, 3 mL, 0.67 M with respect to ODA) was added to the vial and the solution was allowed to stir at 50° C. for ~15 minutes (time sufficient to dissolve reagents in NMP). The clear solution was then filtered through a Nylon syringe filter (0.45 μm) onto a leveled glass plate with aluminum tape (80 μm thickness) boundaries and allowed to cure according to the following ramping procedure: 22° C. to 50° C. over 1 h; then 50° C. to 200° C. over 1 h, and hold at 200° C. for 1 h. The yellow PHT film was then carefully floated from the glass plate cutting the edges with a razor blade and soaking in deionized water. This film is a standard PHT film, but could be thermoplastic modified by including a polymer diamine with the ODA and paraformaldehyde in the reaction mixture. A reaction scheme for making a fully thermoplastic modified PHT film using only a polymer diamine and paraformaldehyde would be as follows:

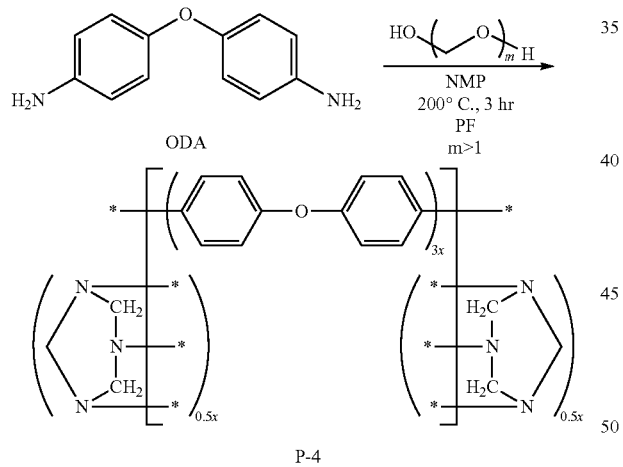

Example 3

Representative Procedure for Casting ODA HDCN Films 4,4'-oxydianiline (ODA, 0.400 g, 2.0 mmol) and paraformaldehyde (5.0 equiv, 0.300 g, 10.0 mmol) were weighed into a 2-Dram vial equipped with a stirbar. N-Methylpyrrolidinone (NMP, 3.0 mL, 0.67 M with respect to ODA) was added to the vial and the solution was allowed to stir at 50° C. for ~15 minutes (time sufficient to dissolve reactants in NMP). The viscous, clear solution was filtered through a Nylon syringe filter (0.45 μm) onto a leveled glass plate with aluminum tape (80 μm thickness) boundaries and allowed to

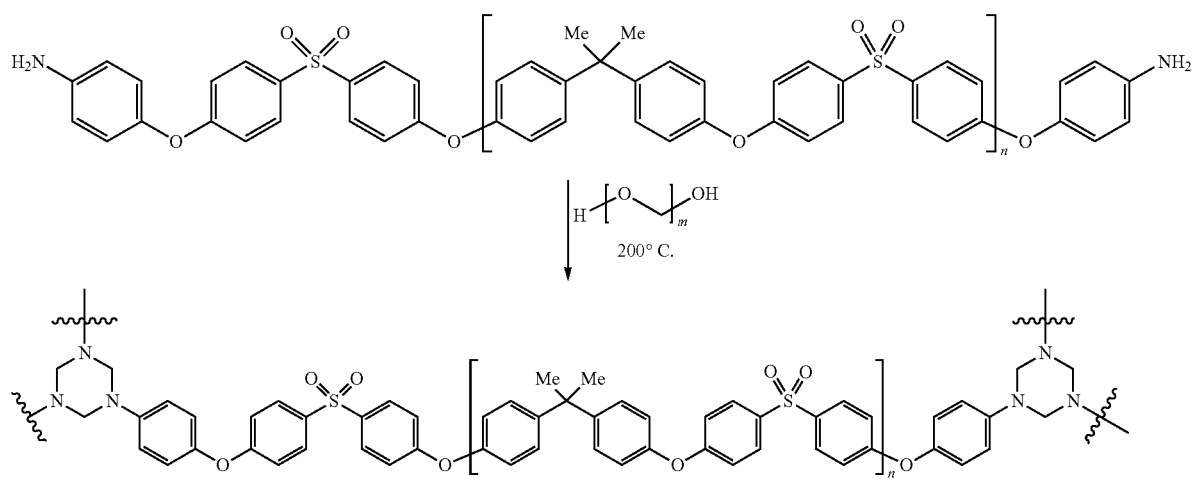

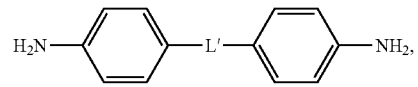

CONCLUSION

The disclosed method of preparing thermoplastic modified polyhexahydrotriazines from electron rich aromatic diamines and polymer diamines provides intermediate thermoplastic modified polyhemiaminals, which are stable up to temperatures less than 150° C. and have improved toughness and impact resistance over similar unmodified polyhemiaminals made without polymer diamine components. When heated to temperatures of at least 150° C., the thermoplastic modified polyhemiaminals form crosslinked thermoplastic modified polyhexahydrotriazines having improved toughness and impact resistance over similar unmodified polyhexahydrotriazines made without polymer diamines components.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

What is claimed is:

1. A method, comprising:
forming a polymer diamine mixture having $M_1$ of at least about 1000 g/mole; forming a reaction mixture comprising i) the polymer diamine mixture, ii) a solvent, iii) paraformaldehyde, and iv) a monomer comprising two primary aromatic amine groups and having the general structure

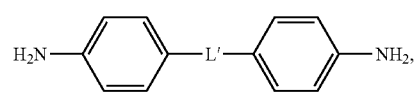

wherein L' is a divalent linking group selected from the group consisting of *—O—*, *—S—*, *—N(R')—*, *—N(H)—*, *—R"—*, and combinations thereof, wherein R' comprises at least one carbon and R" comprises at least one carbon; and heating the reaction mixture at a temperature of 150° C. to about 280° C., thereby forming a polyhexahydrotriazine (PHT).

2. The method of claim 1, wherein each molecule of the polymer diamine mixture has the general structure $H_2N$-Q-$NH_2$, and each Q is independently a vinyl polymer chain, a polyether chain, a polyester chain, a polyimide chain, a polyamide chain, a polyurea chain, a polyurethane chain, a polyaryl ether sulfone chain, a polybenzoxazole chain, a polybenzimidazole chain, an epoxy resin, a polysiloxane chain, a polybutadiene chain, and butadiene copolymer, or a combination thereof.

3. The method of claim 2, wherein each Q is a polyaryl ether sulfone chain.

4. The method of claim 3, wherein L' is *—O—*.

5. The method of claim 3, wherein L' is *—R"—* and R" comprises at least one carbon.

6. A method, comprising:
forming a mixture comprising i) a solvent, ii) paraformaldehyde, iii) a polymer diamine mixture, and iv) a monomer comprising two primary aromatic amine groups and having the general structure

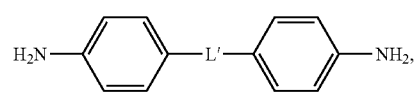

wherein L' is a divalent linking group selected from the group consisting of *—O—*, *—S—*, *—N(R')—*, *—N (H)—*, *—R"—*, and combinations thereof, wherein R' comprises at least one carbon and R" comprises at least one carbon; and heating the mixture at a temperature of about 20° C. or higher to form a polyhemiaminal (PHA).

7. The method of claim 6, wherein each molecule of the polymer diamine mixture has the general structure $H_2N$-Q-$NH_2$, and each Q is independently a vinyl polymer chain, a polyether chain, a polyester chain, a polyimide chain, a polyamide chain, a polyurea chain, a polyurethane chain, a polyaryl ether sulfone chain, a polybenzoxazole chain, a polybenimidazole chain, an epoxy resin, a polysiloxane chain, a polybutadiene chain, and butadiene copolymer, or a combination thereof.

8. The method of claim 7, wherein the solvent is selected from the group consisting of N-methylpyrollidone (NMP), propylene carbonate (PC), dimethylacetamide (DMA), dimethylsulfoxide (DMSO), propylene glycol methyl ether acetate (PGMEA), dimethylformamide (DMF), and combinations thereof.

9. The method of claim 6, wherein the monomer is selected from the group consisting of 4,4'-oxydianiline (ODA), 4,4'-methylenedianiline (MDA), 4,4'-(9-fluorenylidenyl)dianiline (FDA), and combinations thereof, and each molecule of the polymer diamine mixture has the general formula $H_2N$-Q-$NH_2$, wherein each Q is independently a vinyl polymer chain, a polyether chain, a polyester chain, a polyimide chain, a polyamide chain, a polyurea chain, a polyurethane chain, a polyaryl ether sulfone chain, a polybenzoxazole chain, a polybenimidazole chain, an epoxy resin, a polysiloxane chain, a polybutadiene chain, and butadiene copolymer, or a combination thereof.

10. The method of claim 6, further comprising heating the PHA to a temperature of about 150° C. to about 280° C. to form a polyhexahydrotriazine (PHT), wherein the PHT comprises:

a plurality of trivalent hexahydrotriazine groups having the structure

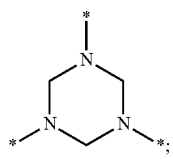

a plurality of divalent bridging groups having the structure

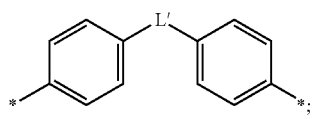

and a plurality of divalent thermoplastic polymer groups having the structure *-Q-* each having a molecular weight of at least 1000 g/mole, wherein L' is a divalent linking group selected from the group consisting of *—O—*, *—S—*, *—N(R')—*, *—N(H)—*, *—R"—*, and combinations thereof, wherein R' comprises at least one carbon and R" comprises at least one carbon, each starred bond of a given hexahydrotriazine group is covalently linked to a respective one of the divalent bridging groups, and each starred bond of a given bridging group is linked to a respective one of the hexahydrotriazine groups.

11. The method of claim 6, wherein the PHA comprises:
a plurality of trivalent hemiaminal groups having the structure

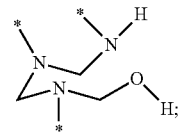

a plurality of divalent bridging groups having the structure

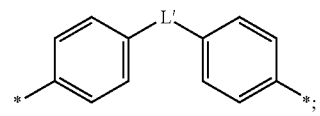

and a plurality of divalent thermoplastic polymer groups having the structure *-Q-* each having a molecular weight of at least 1000 g/mole, wherein L' is a divalent linking group selected from the group consisting of *—O—*, *—S—*, *—N(R')—*, *—N(H)—*, *—R"—*, and combinations thereof, wherein R' comprises at least 1 carbon and R" comprises at least one carbon, each starred bond of a given hemiaminal group is covalently linked to a respective one of the divalent bridging groups, and each starred bond of a given bridging group is linked to a respective one of the hemiaminal groups.

12. The method of claim 6, wherein the mixture further comprises a diluent monomer comprising one primary aromatic amine group.

13. The method of claim 12, wherein the diluent monomer is N,N-dimethyl-p-phenylenediamine (DPD), and the PHT comprises a plurality of N,N-dimethyl-p-phenylene groups:

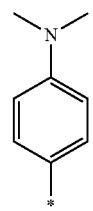

wherein the starred bond is linked to a nitrogen of a hexahydrotriazine group.

* * * * *